United States Patent [19]

Kraus

[11] Patent Number: 4,591,119
[45] Date of Patent: May 27, 1986

[54] PIPE SUPPORT
[75] Inventor: Willibald Kraus, Kaiserslautern, Fed. Rep. of Germany
[73] Assignee: TRW United-Carr GmbH, Frankfurt
[21] Appl. No.: 592,973
[22] Filed: Mar. 23, 1984
[51] Int. Cl.[4] ............................................. F16L 3/08
[52] U.S. Cl. .................................. 248/74.2; 248/316.7
[58] Field of Search ................ 248/74.1, 74.2, 71, 248/65, 73, 68.1, 74.5, 74.3, 316.7; 24/543, 297, 457, 563, 545, 485

[56] References Cited

U.S. PATENT DOCUMENTS

| 3,074,675 | 1/1963 | Brown | 248/74.3 |
| 4,083,523 | 4/1978 | Fisher | 248/74.3 |
| 4,213,589 | 7/1980 | Pierron et al. | 248/74.1 |
| 4,450,605 | 5/1984 | Schaty | 24/485 X |

FOREIGN PATENT DOCUMENTS

| 2058192 | 4/1981 | United Kingdom | 248/74.5 |
| 2066887 | 7/1981 | United Kingdom | 248/74.3 |
| 2092217 | 8/1982 | United Kingdom | 248/74.3 |

Primary Examiner—J. Franklin Foss
Attorney, Agent, or Firm—Fay, Sharpe, Fagan, Minnich & McKee

[57] ABSTRACT

The specification discloses a support element for a pipeline, for example, a gasoline line of a motor vehicle. The support element includes a mounting portion and a minimum of one support region which partially encircles the circumference of the pipeline. This support region consists of three arcuate or disk-shaped elements, in the form of a center dish, an interior dish and an exterior dish. The arrangement of the center dish and the interior dish is such that it is possible to support and hold, in a functionally safe manner, a pipelines of different diameters with one single support element, while protecting the pipelines from damage due to rock impact and the like.

9 Claims, 5 Drawing Figures

PIPE SUPPORT

The subject invention is directed to a support element for pipelines. The invention is specifically useful as a support for a gasoline line in a motor vehicle and will be described with particular reference thereto.

In its general form the support element includes a mounting area and a minimum of one support area. The support area partially encircles the circumference of the pipeline and is comprised of two dish-shaped, arcuate elements in the form of an inner dish and outer dish which surrounds the inner dish at a spaced distance. Both dishes have a common impression area or receipt opening for the pipeline which is to be installed, with a lip on the outer dish and an outer surface of the mounting area forming a slot to the inner dish.

A support element of this general type is already known in the art for the support of pipelines. See, for example, West German Patent No. 30-02-031. With this known construction, the axial distance of the inner dish from the outer dish is such that the inner dish is capable of accepting pipelines of different diameters.

Furthermore, the state of the art includes a support element which is designed in such manner that the dish-shaped support region is surrounded by an additional dish in the form of a U-shaped sheet metal casing, which is connected to the support element. See for example, British Patent No. 1,403,714. The insecure mounting of the pipeline is, however, a disadvantage in this prior art device.

Moreover, an anchoring device is shown in West German Application No. 28-16-181 for which an attachment device is formed to a head in which two C-shaped concave profiles are supplied facing each other in opposing relationship. A pipe can be positioned between and held by the two sections. The application range of this known construction is likewise limited with respect to different pipeline diameters.

It is, accordingly, a primary objective of the present invention to provide a support element, based on the initially cited state of the art, whereby, in simple fashion, pipelines of a large range of diameters will be held safely and securely.

This objective, according to the invention, is solved in that the support area exhibits, on the inside, an elastically designed arcuate center dish, which is positioned at a distance vis-a-vis the inner dish and which is surrounded by same. Because of the center dish it is possible to initially retain in position one pipeline alone, having a small diameter. If pipelines of larger diameter are utilized, the center dish bends and secures the pipeline jointly with the inner dish. Thus, pipelines in a large range of diameters can be secured with perfect results.

According to another characteristic of the invention, the center dish starts in the area of the outer surface of the mounting area and ends within the circumference of the inner dish, so that with larger pipeline diameters there is excellent cooperation between the inner dish and the center dish. In such case, the center dish can extend over approximately 180,.

According to another characteristic of the invention, the inner dish exhibits in the impression region, a smooth nose portion oriented toward the inner circumference of the outer dish. Thus, the center dish can more or less position itself against the inner circumference of the inner dish and secure jointly with the same a pipe of larger diameter.

In another design of the invention, the inner dish can have a recess extending over its entire circumference, into which the center dish can at least partially interfit. By such possibility of interfitting of the center dish into the inner dish, the inner dish can still be more effectively utilized with larger pipeline diameters to produce excellent support for these large pipes. The center dish, in this instance, can extend approximately to the same height as the inner dish.

Furthermore, there is a possibility that the center dish can include, in its lower section, guideways which extend in the longitudinal direction, and pass across the recess of the inner dish. Said guideways are for the purpose of guiding and supporting the pipeline in the support element as long as possible. In such case, the guideways can be designed with thin walls and leaving the lower portion of the center dish free. In addition, the recess can extend through the outer dish, which results in production-related advantages.

The above and other objects and advantages will become apparent from the following description when read in conjunction with the accompanying drawings wherein.

Figure 1:
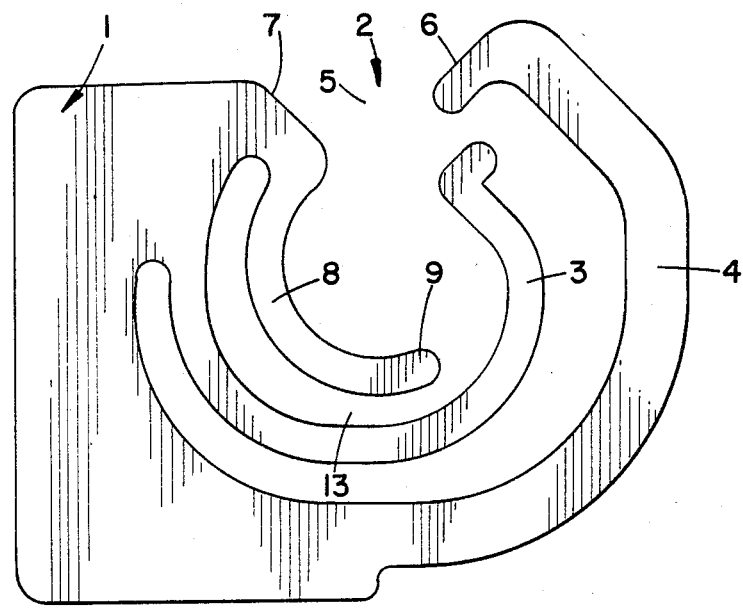
FIG. 1 illustrates a schematic view of a support element formed in accordance with a preferred embodiment of the invention.

Referring more particularly to the drawings wherein the showings are for the purpose of illustrating preferred embodiments of the invention only and not for the purpose of limiting same, FIG. 1 illustrates a support element comprised basically of a mounting portion or area 1 and a support area 2. The mounting area serves to allow the support element to be connected and mounted to any suitable structural portion of a vehicle. Any conventional type of connection can, of course, be used. The support area 2 is specifically formed to accomodate a pipeline, specifically a gasoline line, for a motor vehicle. By means of the support area, the pipeline circumference is partially encircled and thus perfectly supported.

The support area 2 consists of two arcuate, dishshaped elements in the form of an inner dish element 3 and an outer dish element 4 which surrounds the inner dish 3 at a predetermined, spaced distance. The inner dish 3 and the outer dish 4 have a common impression area 5 for the pipeline which is to be installed. Furthermore, there is supplied a lip 6 at the outer dish 4 and an outer surface 7 of the mounting portion 1, whereby lip 6 and outer surface 7 quaranty excellent introduction of a pipe which is to be supported. The support area 2 exhibits toward the inside an elastically designed arcuate center dish 8, which is positioned at a predetermined distance from the inner dish 3 and which is surrounded by the same. In this case, the center dish 8 starts in the area of the outer surface 7 of the storage region and ends within the circumference of inner dish 3. In the embodiment according to FIG. 1, the center dish 8 extends over approximately 180, and ends in a rounded frontal or nose region 9.

If a pipeline with smaller diameter is supported in the support region, the center dish 8 acts in cooperation with the inner dish 3 to secure the pipe. With a pipe of larger diameter, the elastically formed center dish 8 is pressed back, so that the space 13 between the center dish 8 and the inner dish 3 becomes smaller, whereby the elastical center dish 8 and the elastical inner dish 3 holds this larger diameter pipeline perfectly in place. In the maximum instance, the space 13 between the center dish 8 and the inner dish 3 can decrease to zero, whereby larger pipe diameters are fully and perfectly supported.

Figure 2:
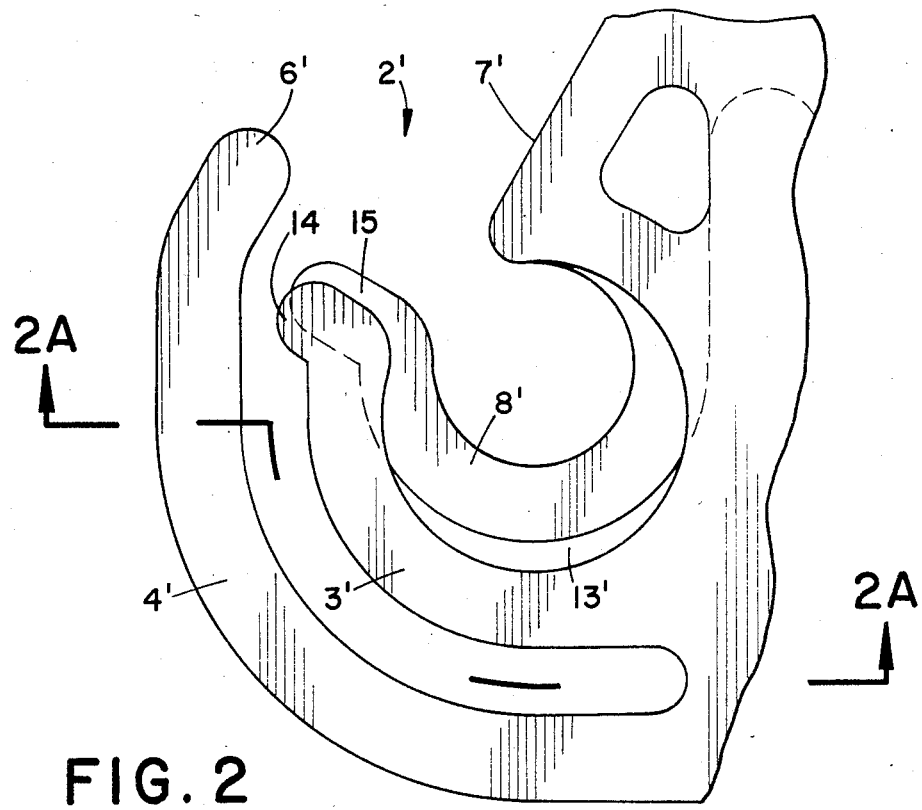
FIG. 2 illustrates another design of a support element.
Figure 2A:
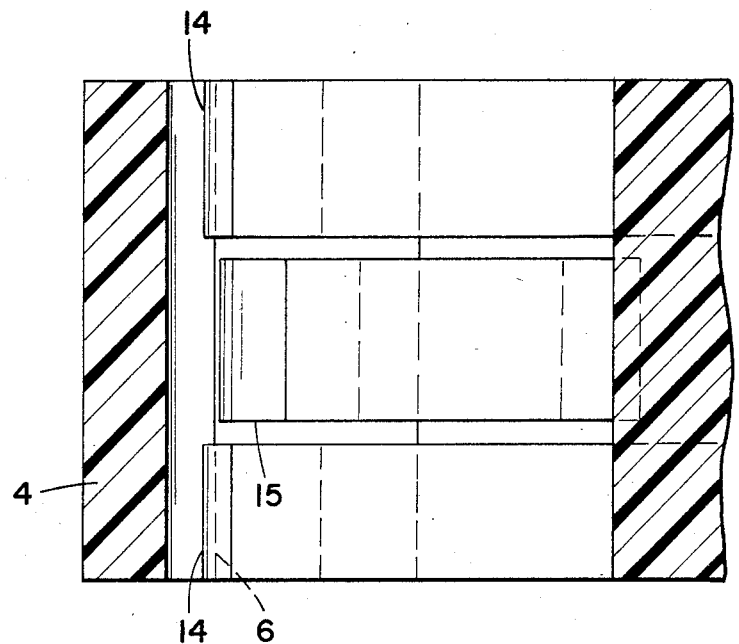
FIG. 2A illustrates a cross-sectional view taken on line 2A—2A of FIG. 1.

In the embodiment according to FIG. 2 and 2A, (reference numerals corresponding to those of FIG. 1 have been used for the same or similar parts but differentiates therefrom by the addition of a prime suffix) and the inner dish 3' includes a pair of arms which define a recess 10. Again, there is a predetermined space 13' between inner dish 3' and center dish 8'. The arms of inner dish 3' in this case envelope center dish 8' in a fork-like fashion. If a pipe of larger diameter is supported by the supporting region 2' of the support element according to the invention, the larger diameter of the pipe which is to be supported presses the center dish 8' into the recess 13 of inner dish 3', in other words, the center dish 8' positions itself into the forked inner dish 3'. For this known construction, the arms of inner dish 3' exhibit lips 14, which extend roughly parallel to a lip 15 of center dish 8'. As a result of the cooperation between outer surface 7', lip 6' and also lips 14 and 15, there is produced, during the introduction of the pipe that is to be supported excellent guidance, until it is encircled by the center dish 8' or the inner dish 3'.

Figure 3:
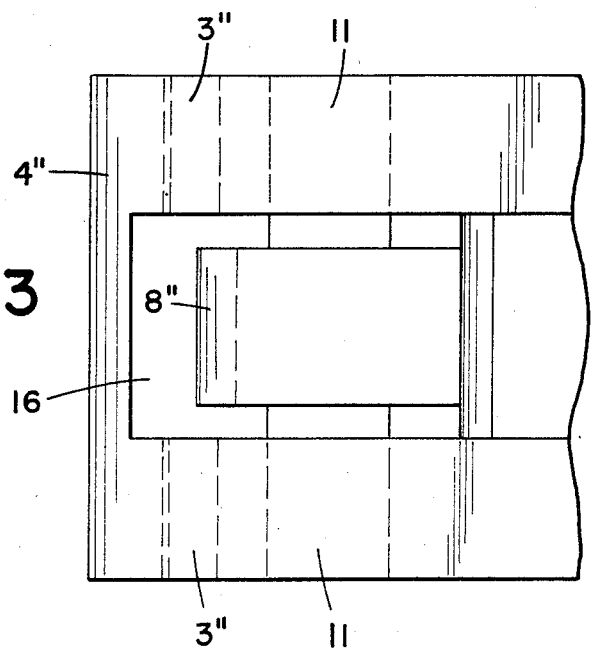
FIG. 3 illustrates a bottom view example of a modified form of support element.
Figure 4:
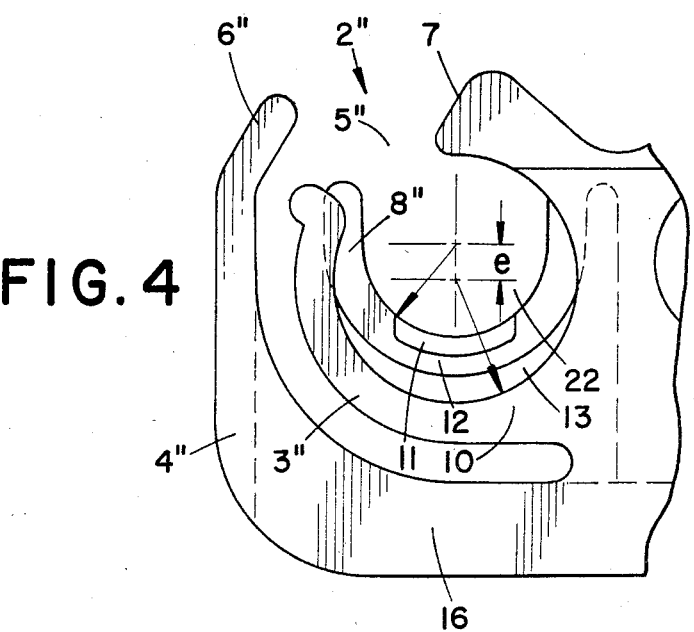
FIG. 4 illustrates a lateral view of the support element shown in FIG. 3.

For the embodiment according to FIGS. 3 and 4, (reference numerals corresponding to those FIG. 1 have been used for the same or similar parts but differentiates therefrom by the addition of a double prime suffix) there is again provided a recess 10, so that the arms of inner dish 3'' envelop the center dish 8'' in a fork-like manner. Said recess 10 extends also through the outer dish 4'', so that an opening 20 is formed in the outer dish. In this construction, the center dish 8'' includes in the lower section longitudinal extending arms 11 which form a guideway 22. These longitudinal arms, according to FIG. 3, extend from both sides of center dish 8'', and, in the lower portion 12'', they let the center dish 8'', run free. Thus, said center dish 8'', when accepting a larger pipeline diameter, can again enter up to the under surface of arms 11 into the recess 10 of the forked inner dish 3'' and thus hold the larger pipeline diameter securely in place. The pipe, in this case, receives excellent guidance through guideway 2''.

As can be seen from FIG. 4, the radius of the inner dish 3'' extends at a distance from the radius of center dish 8''. There is thus present eccentricity e relative to the centers of radii of center dish 8'' and also inner dish 3''.

As a result of the invention it is possible, with one single support element, to perfectly secure and support through center dish 8'' and through the inner dish 3'', different pipeline diameters, which, for example may range between 5 and 10 mm. Thus there results a reduction in inventory whereby, nevertheless, the pipes will receive excellent support and, in addition, the outer dish 4'' will be protected against impact of rock. Because of the impression area 5'', there will be quick assembly and, likewise, excellent disassembly possibility.

Having thus described my invention, I claim:

1. In a support element for a pipeline having a mounting portion and a support portion which partially encircles the pipeline circumference, the support portion comprising two arcuate dish-shaped elements in the form of an inner dish and outer dish, said outer dish being radially spaced from and surrounding the inner dish, said inner dish having a reference center defining its radius within said support, both dishes having a common open area defined by a lip on the outer dish and the exterior surface of the mounting portion, whereby the lip of the outer dish and the exterior surface of the storage area form a slot which leads to the inner dish, the improvement wherein the support portion includes a third resilient arcuate dish member having a reference center defining its radius, said reference centers being offset from one another so that said third dish member is positioned a predetermined distance from and is encircled by said inner dish element.

2. A support element according to claim 1, wherein the center dish element starts in the area of the outer region of the mounting portion and ends inside the circumference of inner dish element.

3. A support element according to claim 2, wherein the arcuate center dish element extends over approximately 180,.

4. A support element according to claim 1 wherein the inner dish includes a lip extending toward the interior circumference of the outer dish element and wherein the terminal end of the center dish element is smoothly rounded.

5. A support element according to claim 1, wherein the inner dish element includes a recess which extends over substantially the entire circumference and into which the center dish element can be at least partially interfitted.

6. A support element according to claim 5, characterized in that the center dish element extends approximately to the same elevation as the inner dish element.

7. A support element according to claim 6, characterized in that the center dish element includes in the lower region longitudinally extending arms which span across the recess of the inner dish.

8. A support element according to claim 7, wherein the arms have thin walls and leave the lower part of the center dish element open.

9. A support element according to claim 8, characterized in that the recess extends through the outer dish.

* * * * *